(12) United States Patent
Bodie

(10) Patent No.: US 12,740,502 B2
(45) Date of Patent: Sep. 22, 2026

(54) MULTI-CROP VALVE FOR AGRICULTURAL INTER-CROPPING

(71) Applicant: 101288550 SASKATCHEWAN LTD., Assiniboia (CA)

(72) Inventor: Cameron Bodie, Assiniboia (CA)

(73) Assignee: 101288550 SASKATCHEWAN LTD., Assiniboia (CA)

( * ) Notice: Subject to any disclaimer, the term of this patent is extended or adjusted under 35 U.S.C. 154(b) by 0 days.

(21) Appl. No.: 18/876,002

(22) PCT Filed: Jun. 20, 2023

(86) PCT No.: PCT/CA2023/050854
§ 371 (c)(1),
(2) Date: Dec. 17, 2024

(87) PCT Pub. No.: WO2023/245281
PCT Pub. Date: Dec. 28, 2023

(65) Prior Publication Data

US 2025/0374851 A1 Dec. 11, 2025

(30) Foreign Application Priority Data

Jun. 21, 2022 (CA) ................................ CA 3164507

(51) Int. Cl.
*A01C 7/08* (2006.01)
*F16K 3/02* (2006.01)
(Continued)

(52) U.S. Cl.
CPC ............ *A01C 7/082* (2013.01); *F16K 3/0254* (2013.01); *F16K 3/312* (2013.01); *F16K 11/22* (2013.01); *Y02P 60/00* (2015.11)

(58) Field of Classification Search
CPC . Y10T 137/87684; F16K 3/02; F16K 3/0209; F16K 3/0218; F16K 3/0227;
(Continued)

(56) References Cited

U.S. PATENT DOCUMENTS 2,214,736 A * 9/1940 Carmichael ............ B65G 53/30 406/127
4,126,296 A * 11/1978 Skor ......................... F16K 3/04 251/185
(Continued)

FOREIGN PATENT DOCUMENTS

DE 1994373 U 9/1968

OTHER PUBLICATIONS

International Search Report and Written Opinion of the ISA for PCT/CA2023/050854, mailed Sep. 7, 2023, 10 pages.

*Primary Examiner* — William M Mccalister
(74) *Attorney, Agent, or Firm* — Nixon & Vanderhye P.C.

(57) ABSTRACT

A valve for use with an air seeder apparatus to selectively seed one or two crops in a field is provided. The valve can include a first inlet connectable to a first air stream carrying a first crop seed, a second inlet connectable to a second air stream carrying a second crop seed, an outlet connectable to a opener hose running to an opener on the air seeder apparatus, and gate valves selectable to: place the first inlet in fluid communication with the outlet while the second inlet is blocked; and, place the second inlet in fluid communication with the outlet while the first inlet is blocked.

11 Claims, 12 Drawing Sheets

(51) Int. Cl.
*F16K 3/312* (2006.01)
*F16K 11/22* (2006.01)

(58) Field of Classification Search
CPC .... F16K 3/0236; F16K 3/0245; F16K 3/0254; F16K 3/0263; F16K 3/0272; F16K 3/0281; F16K 3/029; F16K 3/03; F16K 3/04; F16K 3/06; F16K 3/08; F16K 3/085; F16K 3/10; F16K 3/12; F16K 3/14; F16K 3/16; F16K 3/18; F16K 3/182; F16K 3/184; F16K 3/186; F16K 3/188; F16K 3/20; F16K 3/202; F16K 3/205; F16K 3/207; F16K 3/312; F16K 11/22; A01C 7/082; Y02P 60/00
USPC .................................. 137/606; 251/326–329
See application file for complete search history.

(56) References Cited

U.S. PATENT DOCUMENTS 5,265,547 A * 11/1993 Daws .................... A01C 7/087 111/175
6,883,445 B2 * 4/2005 Mayerle ................ A01C 7/042 111/175
6,996,955 B2 * 2/2006 White, Jr. .............. B65B 43/08 83/402
7,534,074 B2 * 5/2009 Kato ..................... B65G 53/56 251/367
7,555,990 B2 * 7/2009 Beaujot ................ A01C 21/005 111/175
7,690,440 B2 * 4/2010 Dean ...................... A01C 7/088 172/182
8,001,914 B2 * 8/2011 Peterson ................ A01C 7/081 340/684
8,635,963 B2 * 1/2014 Friggstad ............... A01C 7/084 111/175
8,784,013 B2 * 7/2014 Watson ................. F16K 1/2007 137/561 A
9,295,191 B2 * 3/2016 Jagow .................... A01C 7/082
10,470,357 B2 * 11/2019 Rice ..................... A01C 21/005
11,079,026 B2 * 8/2021 Fiorenza ............. A61M 16/208
11,352,222 B2 * 6/2022 Trushin .................. B65G 53/60
11,805,724 B2 * 11/2023 Corelli ................... A01C 7/203
11,930,735 B2 * 3/2024 Jagow .................... A01C 7/084
2003/0217775 A1 * 11/2003 Cousineau ................ F01P 7/16 137/625.4
2012/0227647 A1 * 9/2012 Gelinske ................ A01C 7/081 137/869
2012/0312211 A1 * 12/2012 Hubalek ................ A01C 7/084 111/175
2019/0075719 A1 * 3/2019 Schoeny ................ A01C 7/105
2020/0068788 A1 * 3/2020 Frank ..................... A01C 7/081
2024/0057513 A1 * 2/2024 Ryan ........................ A01C 7/06

* cited by examiner 300
114
124
112
122
110
120
50
150
50
150
150
50
150
50

MULTI-CROP VALVE FOR AGRICULTURAL INTER-CROPPING

This application is the U.S. national phase of International Application No. PCT/CA2023/050854, filed Jun. 20, 2023, which designated the U.S. and claims priority to CA 3164507 filed Jun. 21, 2022, the entire contents of each of which are hereby incorporated by reference.

The present invention relates to inter-cropping of agricultural crops and more particularly a valve for converting conventional air seeders to allow for selective inter-cropping.

BACKGROUND

Inter-cropping is gaining momentum in agricultural as the dynamics in agriculture change across the full spectrum from crop inputs to crop marketing. Inter-cropping is the practice of growing two or more different crops in a field during the same time period. Typically, the goal is to increase overall "field revenue" by increasing production, decreasing disease pressure with increased plant diversity, and decreasing harmful insect pressure with increased plant diversity.

There are different ways of growing more than one crop in a field. One quite basic method is typically referred to as mixed inter-cropping. This involves mixing the different crops together when they are planted in a field. A more advanced method of inter-cropping seeds different crops in alternating rows. In this method, each row of crop is made up of the same crop and rows of the different crops alternate through the field.

One way of seeding a crop is with an air seeder. Air seeders are typically made up of a tool such as an air drill that places the seed in the ground and an air cart that has a number of tanks to hold seed and/or fertilizer which is pneumatically supplied to the tool. Air hoses, with air streams flowing through them, run from the tanks on the air cart to the tool. Seed that exits the tanks drops into one of the air hoses (typically after it is metered). This seed is carried down the air hose, by the air stream passing through the air hose, to the tool where it is typically taken to a distribution tower. The distribution tower distributes the seeds into secondary hoses which run to openers on the tool so that seed can flow down these secondary hoses to the opener to be placed in the ground.

Planting different crops in alternating rows can be challenging and conventional air seeding equipment is typically not set up to plant different crops in alternating rows.

SUMMARY OF THE INVENTION

In an aspect, a valve for use with an air seeder to selectively seed one or two crops in a field is provided. The valve can include a first inlet connectable to a first air stream carrying a first crop seed, a second inlet connectable to a second air stream carrying a second crop seed, an outlet connectable to a opener hose running to an opener on the air seeder apparatus, and gate valves. The gate valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked.

In another aspect, a system for allowing an air seeder to selectively multi-crop and mono-crop is provided. The system can include a first tank for holding a first particulate material, a first distribution tower operatively connected to the first tank by at least one first transport hose and operative to receive the first particulate material from the first tank in a first air stream, a second tank for holding a second particulate material, a second distribution tower operatively connected to the second tank by at least one second transport hose and operative to receive the second particulate material from the second tank in a second air stream, an opener hose leading to an opener, and at least one valve. The at least one valve can include a first inlet connected to the first distribution tower by a first hose, a second inlet connectable to the second distribution tower by a second hose, an outlet connectable to a opener hose running to an opener on the air seeder apparatus. The at least one valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked.

In another aspect, a multi-valve for use with an air seeder to selectively supply particulate material to openers is provided. The multi-valve can include a first valve and a second valve. The first valve having a first inlet, a second inlet connectable to a first air stream carrying a first particulate material, an outlet connectable to a opener hose running to an opener on the air seeder apparatus, and at least one gate valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked. A second valve having a first inlet connected to the first inlet of the first valve, a second inlet connectable to an opener hose running to an opener on the air seeder apparatus, an outlet connected to a second air stream carrying a second particulate material, and at least one gate valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked.

In another aspect, a system for allowing an air seeder to selectively apply seed and fertilizer is provided. The system can have a first tank for holding a first particulate material, a first distribution tower operatively connected to the first tank by at least one first transport hose and operative to receive the first particulate material from the first tank in a first air stream, a second tank for holding a second particulate material, a second distribution tower operatively connected to the second tank by at least one second transport hose and operative to receive the second particulate material from the second tank in a second air stream, opener hoses leading to openers, and a plurality of multi-valves connected to both the first distribution tower by a first hose and the second distribution tower by a second hose. Each multi-valve can have a first valve and second valve. The first valve can include a first inlet, a second inlet connected to a first air stream carrying a first particulate material, an outlet connectable to a opener hose running to an opener on the air seeder apparatus, and at least one gate valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked. The second valve can include a first inlet connected to the first inlet of the first valve, a second inlet connectable to an opener hose running to an opener on the air seeder apparatus, an outlet connected to a second air stream carrying a second particulate material, and at least one gate valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
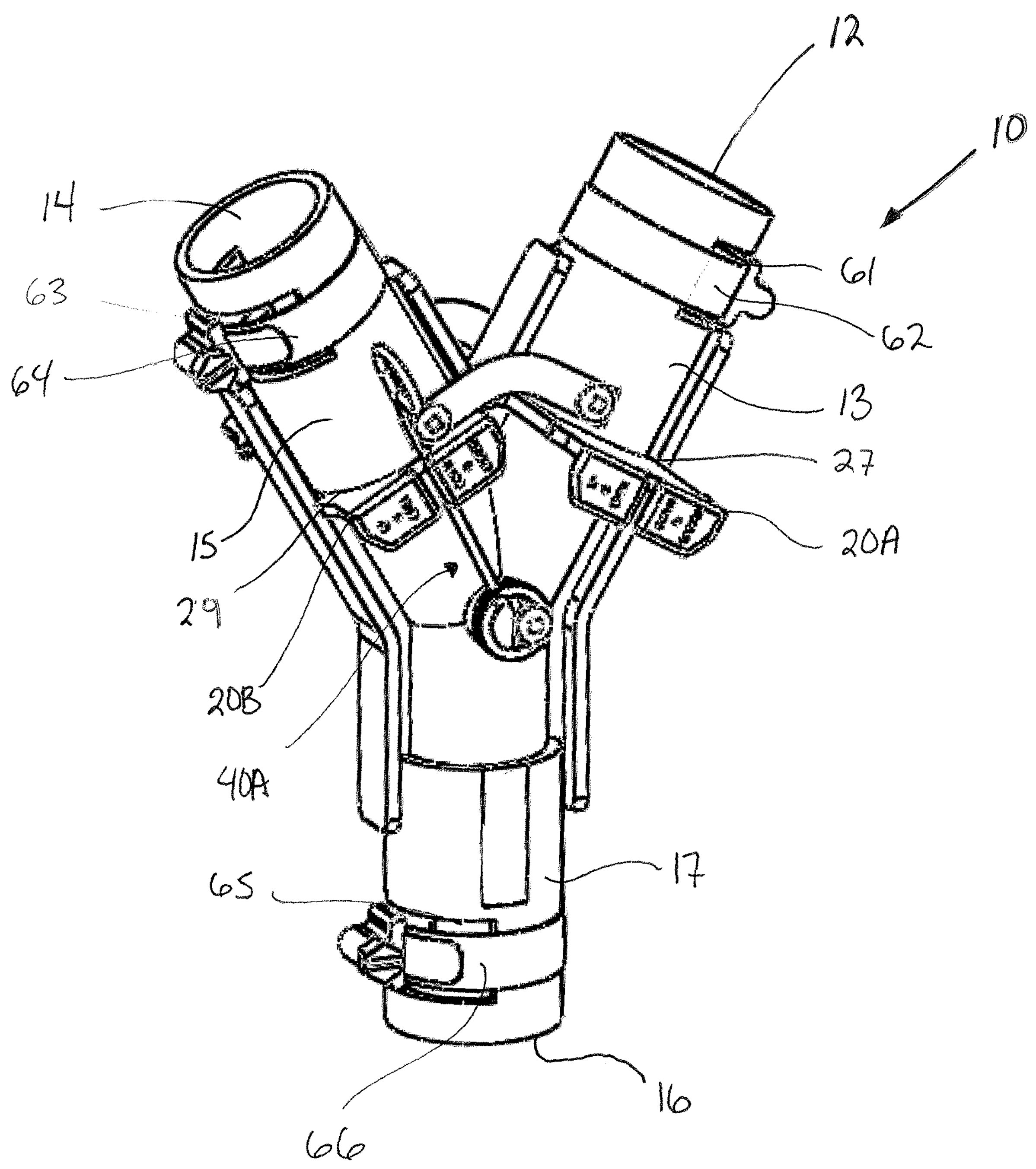
FIG. 1 is a front perspective view of a valve for use in a conventional air seeder apparatus to allow the air seeder apparatus to seed either one or two crops in a field.

FIGS. 1, 2A, 2B, 2C, and 2D illustrate a valve 10 that can be used to allow a conventional air seeder (not shown) to seed either one crop or two crops in the same field. The valve 10 can be inserted into the air stream from an air cart and allow easy switching back and forth between mono-cropping and inter-cropping. The valve 10 can be generally y-shaped and have a first inlet 12 leading to a first tube 13 and a second inlet 14 leading to a second tube 15. Gate valves 20A, 20B can be used to selectively open either the first tube 13 and the second tube 14 while simultaneously closing off the other tube 13, 15. An outlet 16 can be provided connected to an outlet tube 17. The first tube 13, the second tube 15 and the outlet tube 17 form passages through which air can flow, with the passages in the first tube 13 and the second tube 15 leading into the passage in the outlet tube 17 and exiting from the valve 10.

Figure 2A:
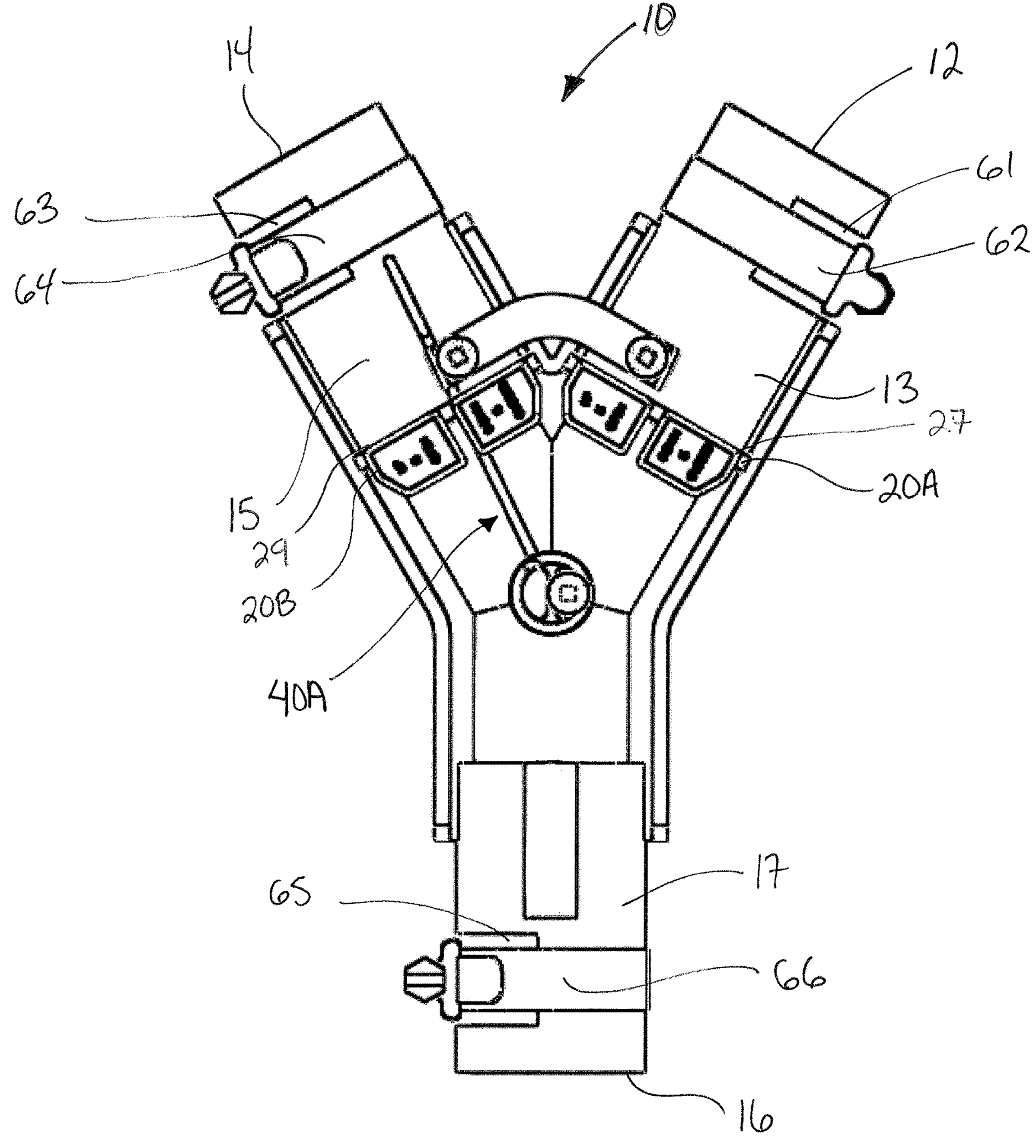
FIG. 2A is a front view of the valve shown in FIG. 1.
Figure 2B:
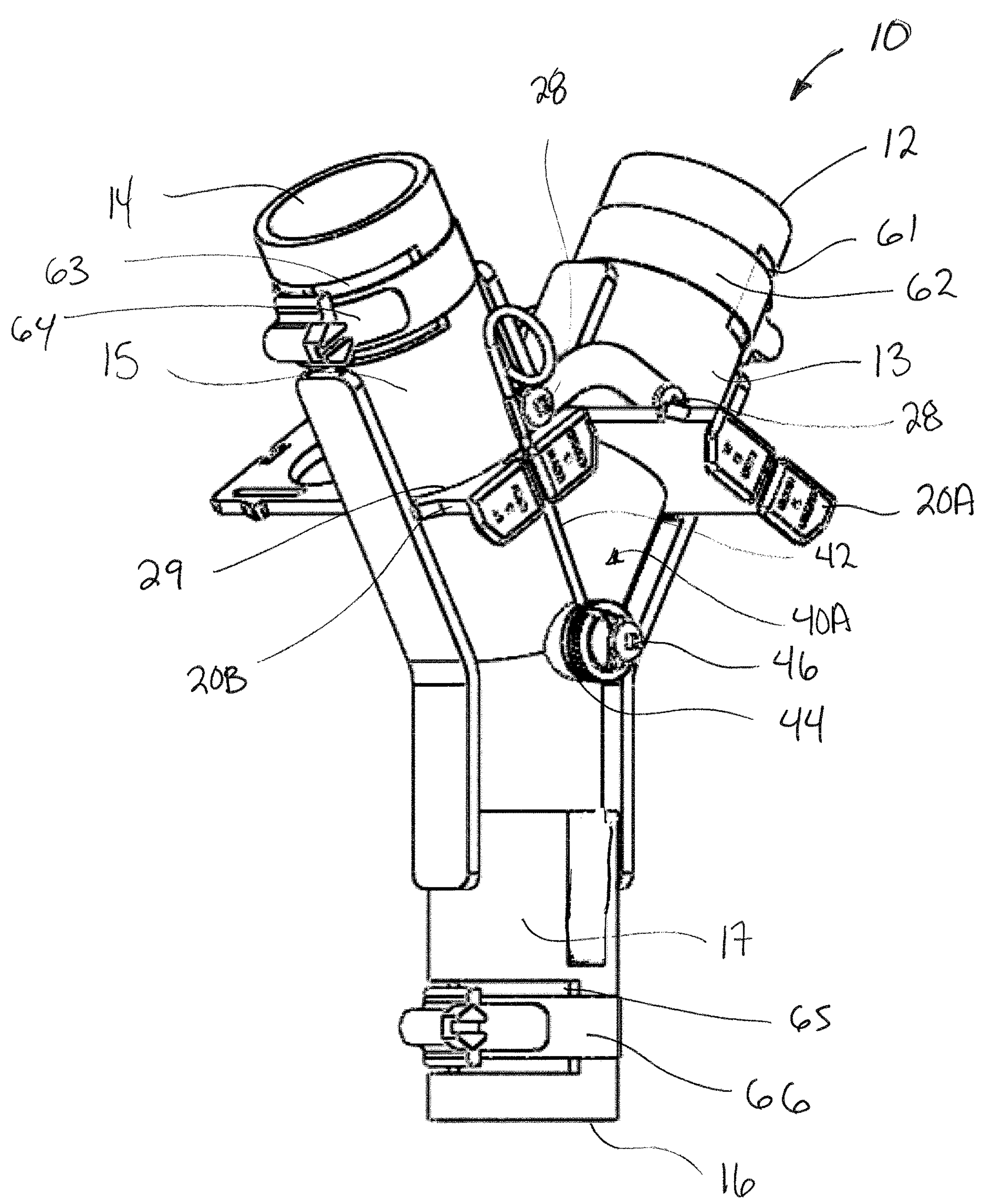
FIG. 2B is a front perspective view of the valve shown in FIG. 1 with a first tube in an open position and a second tube in a closed position.
Figure 2C:
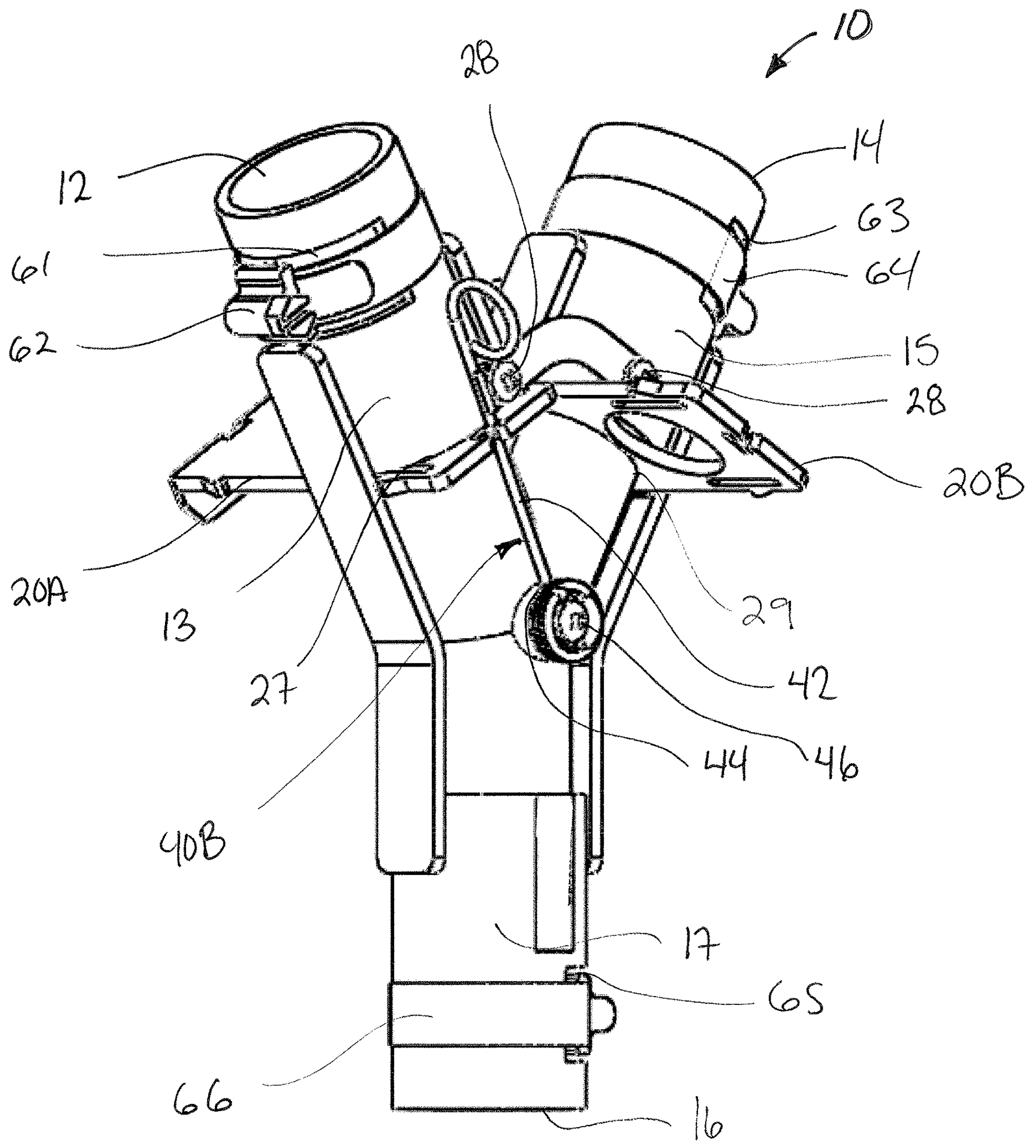
FIG. 2C is a rear perspective view of the valve shown in FIG. 2B.
Figure 2D:
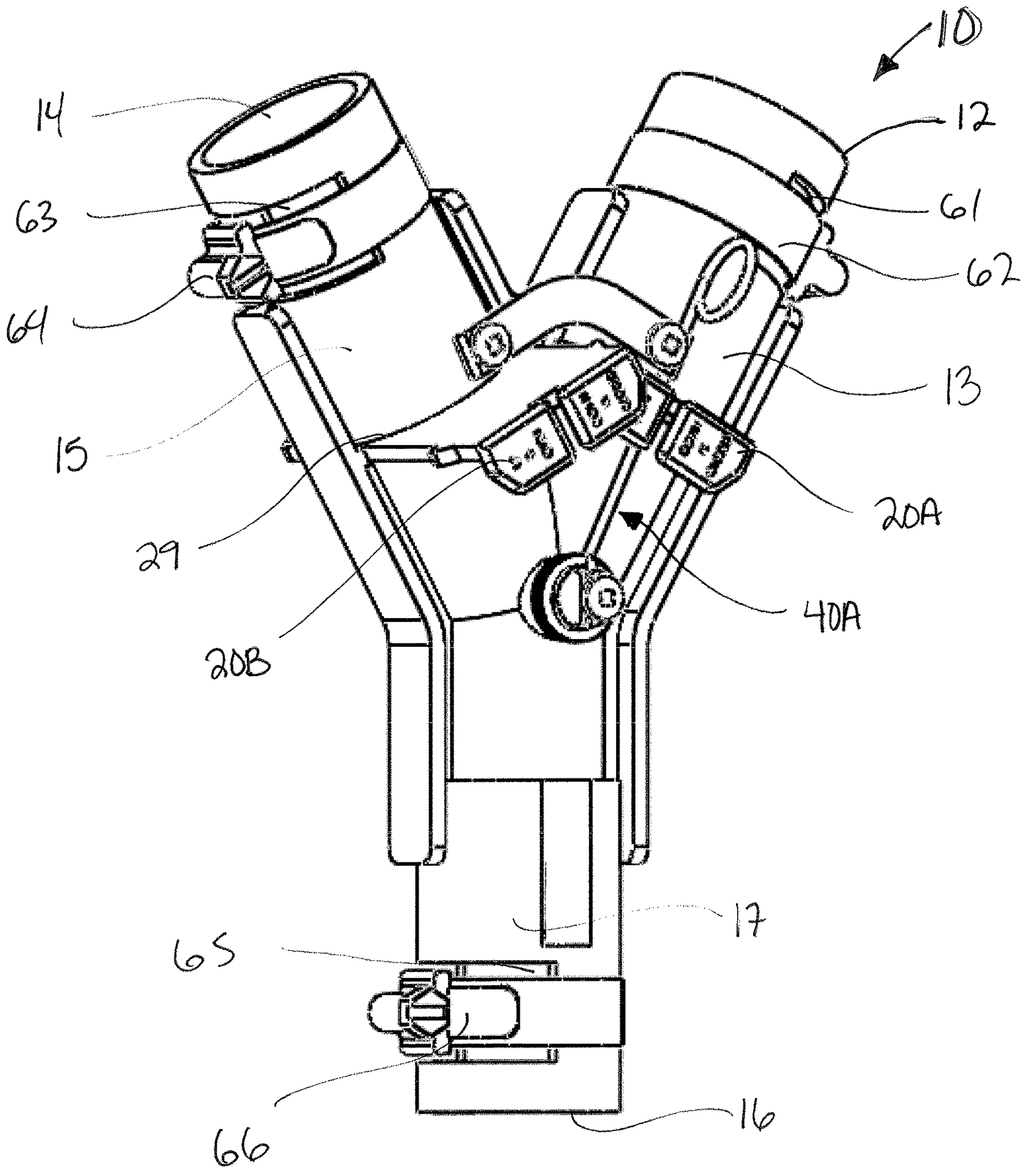
FIG. 2D is a front perspective view of the valve shown in FIG. 1 with a first tube in a closed position and a second tube in an open position.

In this manner, the gate valves 20A, 20B are selectable between: a first position, placing the first inlet 12 in fluid communication with the outlet 16 while fluid communication between the second inlet 14 and the outlet 16 is blocked, as shown in FIG. 2B; and, a second position, placing the second inlet 14 in fluid communication with the outlet 16 while fluid communication between the first inlet 12 and the outlet 16 is blocked, as shown in FIG. 2D.

Figure 1A:
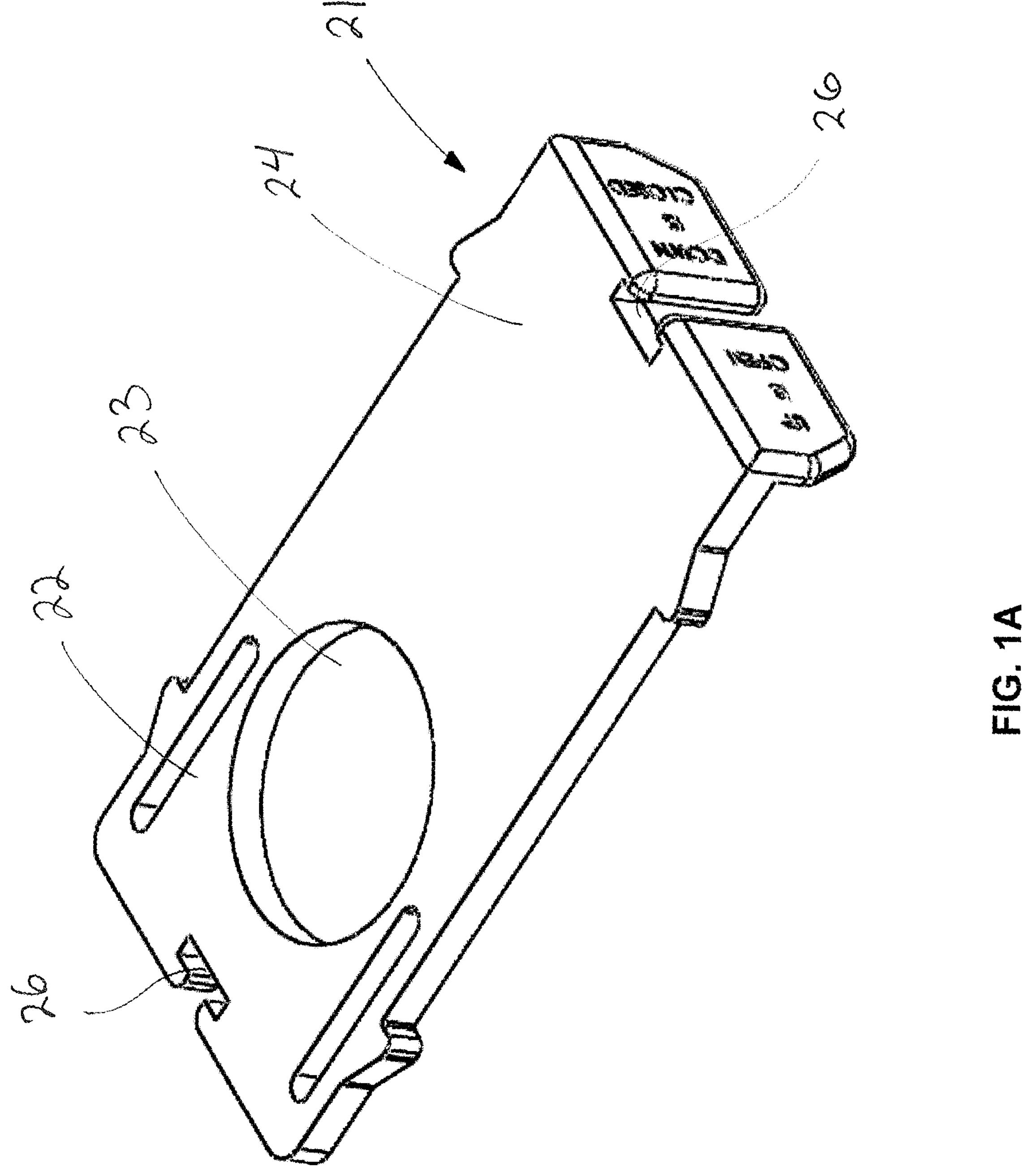
FIG. 1A is a perspective view of a plate used in gate valves in the valve of FIG. 1.

A first gate valve 20A can be provided passing through the first tube 13 and a second gate valve 20B can be provided passing through the second tube 15. The first gate valve 20A can have a gate plate 21, as shown in FIG. 1A, that slides through an opening 27 in the first tube 13. The gate plate 21 can have a first side 22 having an aperture 23 passing through the first side 22 of the gate plate 21 and a second side 24 that is solid (does not have an aperture) to block the flow through the first tube 13. The aperture 23 in the first side 22 can be sized to match the internal diameter of the first tube 13. The gate plate 21 can also have a notches 26 on the ends of the first side 22 and the second side 24 of the gate plate 21.

The first gate valve 20A can be selectively positioned between: an open position, where the gate plate 21 is positioned so that the first side 22 of the gate plate 21 is slid inside the first tube 13 with the aperture 23 allowing a passage through the first tube 13 and the second side 24 of the gate plate 21 extended outside of the first tube 13; and, a closed position, where the gate plate 21 is positioned so that the second side 24 of the gate plate 21 is slid inside the first tube 13 blocking the passage in the first tube 13 and the first side 22 of the gate plate 21 with the aperture 23 is extended outside of the first tube 13.

The second gate valve 20A can also have a gate plate 21, as shown in FIG. 1A, that slides through an opening 29 in the second tube 15. The second gate valve 20B can also be selectively positioned between: an open position where the gate plate 21 is positioned so that the first side 22 of the gate plate 21 is slid inside the second tube 15 with the aperture 23 allowing a passage through the second tube 15 and the second side 24 of the gate plate 21 extended outside of the second tube 15; and, a closed position where the gate plate 21 is positioned so that the second side 24 of the gate plate 21 is slid inside the second tube 15 blocking the passage in the second tube 15 and the first side 22 of the gate plate 21 with the aperture 23 is extended outside of the first tube 13.

In this manner, when the first gate valve 20A is in the open position, as shown in FIG. 2B, the plate 21 of the first gate valve 20A can be positioned with the second side 24 of the plate 21 positioned extended out a first side of the valve 10 and the first side 22 of the gate plate 21 and the aperture 23 in the gate plate 21 positioned inside the first tube 13, the second gate valve 20B can be slid into the closed position with the first side 22 of the gate plate 21 positioned extending out a second side of the valve 10 with the second side 24 of the gate plate 21, which lacks an aperture passing through it, blocking the passage through the second tube 15. While the first gate valve 20A is in this open position, an airstream carrying particulate material, like seed, can flow through the first tube 13 (through the aperture 23 in the gate plate 21) to the outlet tube 17, while the second gate valve 20B block air from traveling through the second tube 15.

Alternatively, when the second gate valve 20B is slid into the open position, as shown in FIG. 2D, the gate plate 21 of the second gate valve 20B can be positioned with the second side 22 of the gate plate 21 positioned extended out the first side of the valve 10 and the aperture 23 in the gate plate 21 inside the second tube 15, the first gate valve 20A can be slid into the closed position with the first side 22 of the gate plate 21 positioned extending out a second side of the valve 10 with the second side 24 of the gate plate 21, which lacks an aperture passing through it, blocking the passage through the first tube 13. While the second gate valve 20B is in this open position, an airstream carrying particulate material, like seed, can flow through the second tube 15 (through the aperture 23 in the gate plate 21) to the outlet tube 17, while the first gate valve 20A blocks air from traveling through the first tube 13.

Latching members 40A, 40B can be provided to secure the gate valves 20A, 20B in their desired positions and ensure that the gate valves 20A, 20B are in opposing positions (i.e. if the first gate valve 20A is in the open position the second gate valve 20B is in the closed position and vice versa). As shown in FIGS. 2B and 2C, each latching member 40A, 40B can have a lever 42, a biasing element 44, such as a torsion spring, and a pivot point 46 where the lever 42 is rotatably connected valve 10.

The biasing element 44 can biases the lever 42 towards the valve 10 and in a position between the first gate valve 20A on the first tube 13 and the second gate valve 20B on the second tube 15.

In one aspect, the pivot point 46 can be positioned where the first tube 13 and the second tube 15 intersect with the outlet tube 17.

As shown in FIGS. 2B and 2C, stops 48 can be provided adjacent to the first gate valve 20A and the second gate valve 20B to hold the latching member 40A, 40B in place securing one of the first gate valve 20A and the second gate valve 20B in position.

A first latching member 40A can be provided on the first side of the valve 10, as shown in FIG. 2B, and a second latching member 40B can be provided on the second side of the valve 10, as shown in FIG. 2C.

Notches 26 can be provided on the ends of the first side 22 and the second side 24 of each gate plate 21 of the gate valves 20A, 20B. These notches 26 can receive the lever 42 of the latching mechanism 40A, 40B on the corresponding side of the valve 10 and overcome the bias placed on the lever 42 by the biasing element 44 to move the lever back to a position between the first gate valve 20A and the second gate valve 20B. The biasing of the lever 42 towards the valve 10 can hold the lever 42 in these notches 26.

Both the first gate valve 20A and the second gate valve 20B can be oriented in the same direction with the gate plates 21 in each of the gate valves 20A, 20B oriented so the first side 22 of each gate plate 21 extends out the first side of the valve 10 when the gate valves 20A, 20B are in their open positions and the second side 24 of each gate plate 21 extends out a back side of the valve 10 when the gate valve 20A, 20B is in the closed position.

In this manner, when the first gate valve 20A is in the open position, as shown in FIG. 2B, the gate plate 21 of the first gate valve 20A can be positioned with the second side 24 of the gate plate 21 positioned extending out the first side of the valve 10 and the aperture 23 on the first side 22 of the gate plate 21 inside the first tube 13. While the first gate valve 20A is in the open position, allowing an airstream to flow through the first tube 13 to the outlet tube 17, the second gate valve 20B can be in the closed position with the first side 22 of the gate plate 21 positioned extending out the second side of the valve 10 and the second side 24 of the gate plate 21, which is solid and lacks an aperture, blocking the passage through the second tube 15.

The first latching member 40A can then be pivoted around its pivot point 46 and into the notch 26 on the second side 24 of the gate plate 21 of the second gate valve 20B which is in the closed position, with the lever 42 of the first latching member 40A biased against the gate plate 21 of the second gate valve 20B and maintaining the second gate valve 20B in the closed position. The notch 26 will prevent the biasing element 44 from returning the lever 42 to a position between the first gate valve 20A and the second gate valve 20B. The second latching member 40B on the second side of the valve 10 can be pivoted around its pivot point 26 and the lever 42 of the second latching member 40B inserted into the notch 26 on the first side 22 of the gate plate 21 of the first gate valve 20A which is in the open position. The biasing element 44 of the second latching member 40B will bias the lever 42 of the second latching member 40 against first side 22 of the gate plate 21 in the first gate valve 20A and maintain the first gate valve 20A in the open position. The notch 26 will prevent the biasing element 44 from returning the lever 42 to a position between the first gate valve 20A and the second gate valve 20B.

When it is desired to block the first tube 13 and open the second tube 15, the first gate valve 20A can be placed in its closed position, as shown in FIG. 2D, and the second gate valve 20B can be placed in its open position. The gate plate 21 of the first gate valve 20A can be positioned with the first side 22 of the gate plate 21 positioned extending out the second side of the valve 10 with the second side 24 of the gate plate 21 blocking the first tube 13 and the second gate valve 20B can be positioned with the second side 24 of the gate plate 21 positioned extending out the first side of the valve 10 with the first side 22 of the gate plate 21 positioned in the second tube 16 and the aperture 23 in the first side 22 of the gate plate 21 allowing air to flow through the second tube 15.

The first latching member 40A can be pivoted around its pivot point 46 and into the notch 26 on the second side 24 of the gate plate 21 of the first gate valve 20A which is in the closed position, with the first latching member 40A biased into the notch 26 and against the gate plate 21 in the first gate valve 20A, the first latching member 40A can maintain the first gate valve 20A in the closed position. The second latching member 40B can be pivoted around its pivot point 46 and into the notch 26 on the first side 21 of the gate plate 21 of the second gate valve 20B which is in the open position, with the second latching member 40B biased into the notch 26 and against the gate plate 21 in the second gate valve 20B, the second latching member 40B can maintain the second gate valve 20B in the open position.

The first tube 13 can be oriented at an angle A of substantially 30° to the outlet tube 17 and the second tube 15 can be oriented at an angle B of substantially 30° to the outlet tube 17. The closer an air passage is to straight, the better the flow through the air passage, with bends and corners in the air passage, affecting the air flow. By using gate valves 20A, 20B in the first tube 13 and the second tube 15, respectively, the gate valves 20A, 20B use less width than other valve types and can allow a shallower angle between the first tube 13 and the second tube 15 than if other types of valves were used.

The first input 12, the second input 14 and the outlet 16 can have inner diameters sized to accept hoses through which particulate material, like seed, is transported by an air stream. For example, if the valve 10 is to be used with hoses that are 1.25 inches in diameter, the inner diameter of the first input 14, the second input 14 and the outlet 16 can be sized to allow the 1.25 inch diameter hoses to pass through.

If the valve 10 is to be used with hoses that are 1 inch in diameter, the inner diameter of the first input 12, the second input 14 and the outlet 16 can be sized to allow the 1 inch diameter hose to pass through.

Openings 61, 63, 65 can be provide in the first tube 13, the second tube 15 and the outlet tube 17, respectively, so that fasteners 62, 64, 66, such as a hose clamp, can be used to secure hoses in the first tube 13, the second tube 15 and the outlet tube 17, respectively.

Figure 3:
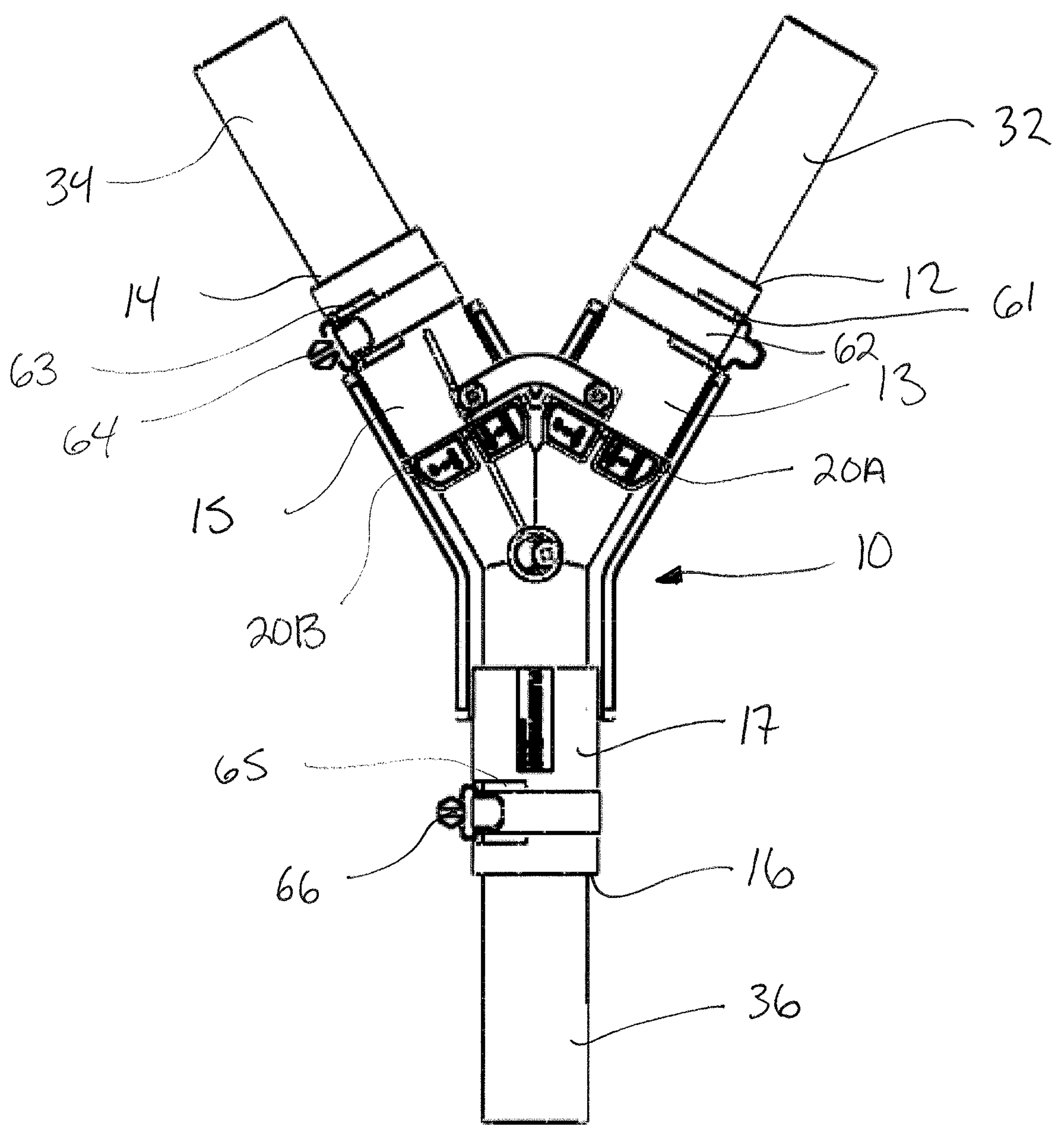
FIG. 3 is a front view of the valve of FIG. 1 connected to hoses to carry air streams.

Referring to FIG. 3, the valve 10 can be connected to a first air hose 32 and a second air hose 34 coming from an air cart (not shown) where each air hose 32, 34 is typically coming from a different tank on the air cart so that each air tube 32, 34 is transporting a different type of seed. Typically, these hoses 32, 34 will be coming from distribution towers (not shown). The first hose 32 for carrying a first air stream with a first crop seed can be connected to the first input 12 and the second hose 34 for carrying a carrying a second air stream with a second crop seed can be connected to the second input 14.

To connect the first hose 32 to the first input 12, the first hose 32 can be inserted into the first input 12 and extending into the first tube 13. When the first hose 32 is inserted into the first tube 13, but still upstream from the first gate valve 20A, the fastener 62 can be tightened around the first tube 13 with some of the fastener 62 passing through the opening 61 and against the first hose 32 extending into the first tube 13, securing the first hose 32 in place inserted in the first tube 13.

To connect the second hose 34 to the second input 14, the second hose 34 can be inserted into the second input 14 and extending into the second tube 15. When the second hose 34 is inserted into the second tube 15, but still upstream from the second gate valve 20A, the fastener 63 can be tightened around the second tube 15 with some of the fastener 63 passing through the opening 62 and against the second hose 34 extending into the second tube 15, securing the second hose 34 in place in the second tube 15.

The outlet 16 can be connected to an opener hose 36 running down to an opener to deposit seed that has passed through the valve 10, into the ground. To connect the opener hose 36 to the outlet 16, the opener hose 36 can be inserted into the outlet 16 and extending into the outlet tube 17. When the opener hose 36 is inserted into the outlet tube 17, the fastener 66 can be tightened around the outlet tube 17 with some of the fastener 66 passing through the opening 65 and against the opener hose 36 extending into the outlet tube 17, securing the opener hose 36 in place inserted in the outlet tube 17.

The gate valves 20A, 20B can be used to select whether the first input 12 is in fluid communication with the outlet 16 or the second input 14 is in fluid communication with the outlet 16. When the first input 12 is placed in fluid communication with the outlet 15 by the gate valves 20A, 20B, the first air stream passing through the first hose 32 can travel through the valve 10 and the open first gate valve 20A to the outlet 16 while the second input 14 and second tube 15 is blocked by the second gate valve 20B. When the second input 14 is placed in fluid communication with the outlet 16, the second air stream passing through the second hose 34 can travel through the valve 10 and the open second gate valve 20B to the outlet 16 while the first input 12 is blocked by the first gate valve 20A.

Because the height of the gate valve 20A, 20B is relatively short, just slightly more than the thickness of the gate plate 21, the overall height of the valve 10 can be made quite compact. In one aspect, the valve 10 can be made 8 inches or even less high and 5.5 inches wide. In a further aspect, the hose to hose length of the of the valve 10 (the distance between an end of the first hose 32 inserted in the first tube 13 of the valve 10 and an end of the opener hose 36 inserted in the outlet tube 17 of the valve 10 or the distance between an end of the second hose 34 inserted in the second tube 15 of the valve and an end of the opener hose 36 inserted in the outlet tube 17 of the valve 10) could be substantially 3.5 inches when the tubes 13, 15 and 18 have a 1.25 inch inner diameter and in another aspect, the hose to hose length of the valve 10 could be substantially 3.1 inches when the tubes 13, 15 and 18 have a 1 inch inner diameter.

Figure 4A:
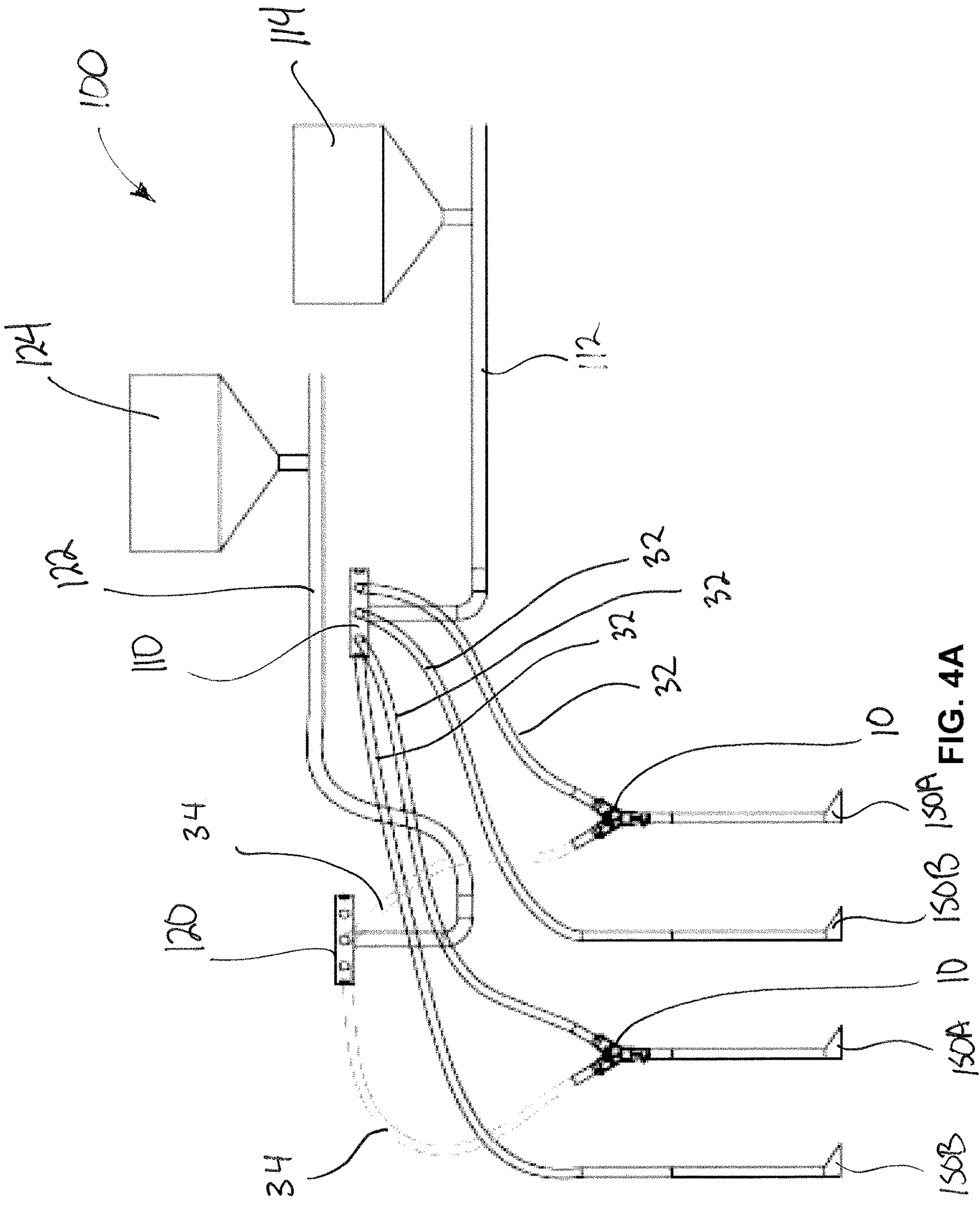
FIG. 4A is a schematic illustration of a system incorporating the valve of FIG. 1 for selectively seeding alternate rows of different crops.

Referring to FIG. 4A, a system 100 incorporating the valves 10 is shown, to convert a conventional tool of an air seeder, such as an air drill, for inter-cropping. The system 100 can have a first distribution tower 110 for distributing a first particulate material, such as a first crop seed, through first hoses 32 and a second distribution tower 120 for distributing a second particulate material, such as a second crop seed, through second hoses 34. The first distribution tower 110 and the second distribution tower 120 would typically be provided on a tool, such as an air drill, that plants the seed in the ground.

The first distribution tower 110 can be connected to a first tank 114 on an air cart by a first transport hose 112 directing a first air stream from the air cart to the first distribution tower 110 on the tool. The first tank 114 can contain the first crop seed which can be transported from the first tank 114 to the first distribution tower 110 through the first transport hoses 112 by the first air stream. The second distribution tower 120 can be connected to a second tank 124 on the air cart by a second transport hose 122 directing a second air stream from the air cart to the second distribution tower 120 on the tool. The second tank can contain the second crop seed which can be transported from the second tank 122 to the second distribution tower 110 through the second transport tube 122 by the second air stream.

In the configuration shown in FIG. 4A, valves 10 can be connected to a first set of openers 150A consisting of every other opener on the tool, to allow the system 100 to selectively seed alternate rows with a different crop, allowing a user to easily configure the system for either mono-cropping or inter-cropping. A valve 10 can be connected inline between both the first distribution tower 110 and the second distribution tower 120 and every other opener on the tool. For each valve 10, the first hose 32 can be connected between the first distribution tower 110 and the first input 12 of the valve 10 and the second hose 34 can be connected between the second distribution tower 120 and the second input 14 of valve 10. The outlet 16 of the valve 10 can be connected to the opener hose 36 running to one of the openers.

A second set of openers 150B, where each opener is provided adjacent to an opener in the first set of openers 150A, can have opener hoses 36 connected directly to the first distribution tower 110.

To mono-crop with the system 100 in the configuration shown in FIG. 4A, the gate valves 20A, 20B on each valves 10 can be set to allow first crop seed from the first distribution tower 110 to flow through the valve 10, while blocking second crop seed from the second distribution tower 120 from reaching the opener. First crop seed from the first distribution tower 110 can be supplied to every opener on the tool, including those connected to the valve 10, to plant the first crop in the field. The first crop seed will be supplied to the openers in both the first set of openers 150A and the openers in the second set of openers 150B. In this manner, every row of crop planted in a field will be the first crop.

To inter-crop using the system 100, the gate valves 20A, 20B on the valves 10 can be set to allow second crop seed from the second distribution tower 120 to flow through the valve 10, while blocking first crop seed from the first distribution tower 110 from reaching the opener. In this manner, first crop seed from the first distribution tower 110 can be supplied to every opener on the tool in the second set of openers 150B that is not connected to a valve 10, while the openers in the first set of openers 150A that are connected to valves 10 can be supplied with second crop seed. In this manner, first crop seed and second crop seed will be planted in alternating rows in a field.

Figure 4B:
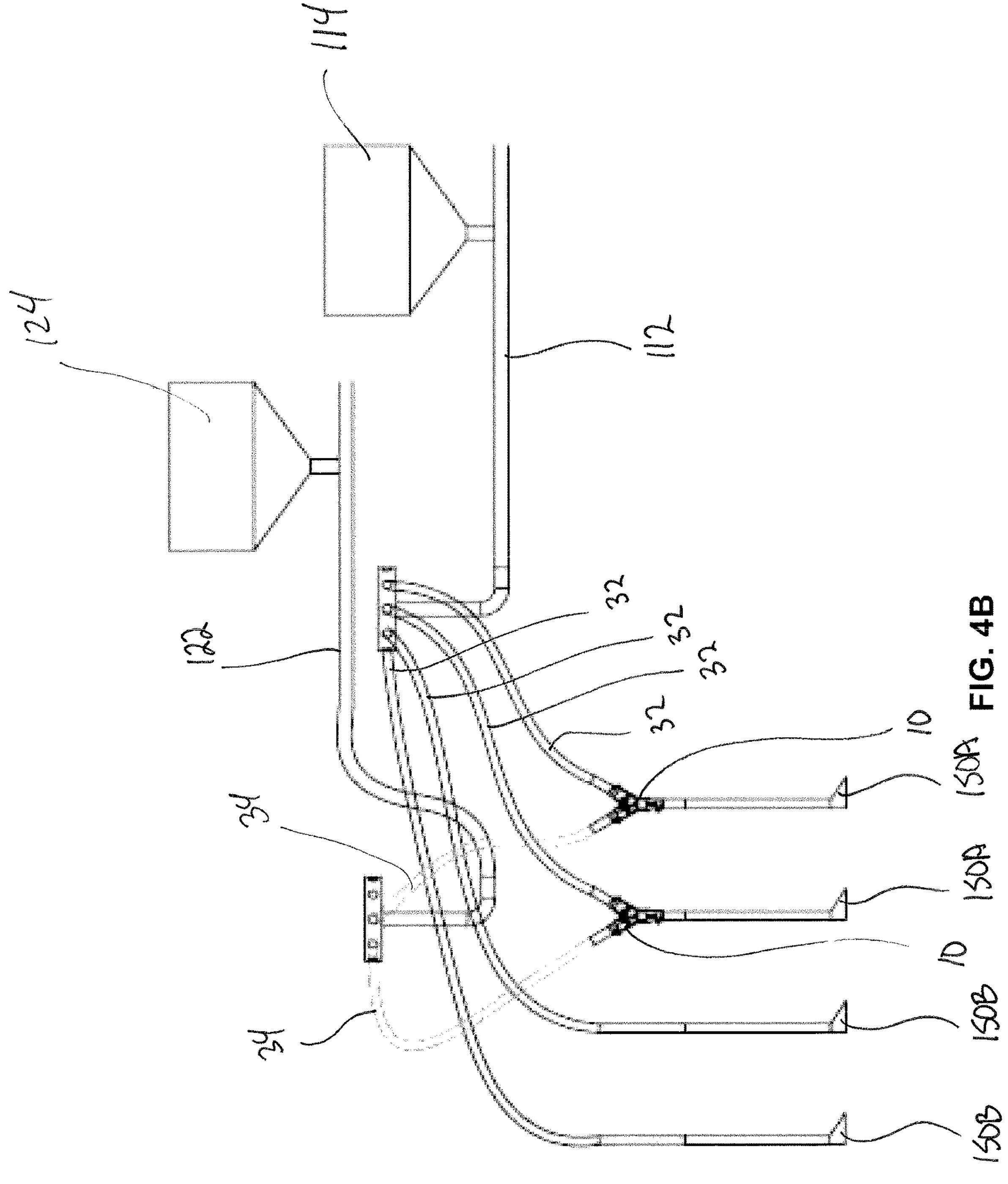
FIG. 4B is a schematic illustration of a system incorporating the valve of FIG. 1 for selectively seeding alternate row pairs of different crops.

FIG. 4B, shows a second system 200 in a configuration that allows inter-cropping where there are alternating pairs of rows of two different crops (alternating pairs of twin rows). Where valves 10 are connected to adjacent pairs of openers. For each valve 10, the first hose 32 can be connected between the first distribution tower 110 and the first input 12 of the valve 10 and the second hose 34 can be connected between the second distribution tower 120 and the second input 14 of valve 10. The outlet 16 of the valve 10 can be connected to the opener hose 36 running to one of the openers.

The first crop can be planted in pairs of adjacent rows that alternate with pairs of adjacent rows of the second crop.

Valves 10 can be connected inline between both the first distribution tower 110 and the second distribution tower 120 and a first set of openers 150A comprising pairs of adjacent openers on the tool. A second set of openers 150B, comprising pairs of adjacent openers provided between the pairs of adjacent openers in the first set of openers 150A can be connected to valves 10, these openers can have opener hoses 36 connected directly to the first distribution tower 110.

To mono-crop with the system 200, the gate valves 20A, 20B on the valves 10 can be set to allow first crop seed from the first distribution tower 110 to flow through the valve 10, while blocking second crop seed from the second distribution tower 120 from reaching the opener. In this manner, first crop seed from the first distribution tower 110 can be supplied to every opener on the tool, including the openers in the first set of openers 150A connected to the valves 10 and the openers in the second set of openers 150B, to plant the first crop in the field, so each row of crop is the first crop.

To inter-crop using the system 200, the gate valves 20A, 20B on the valves 10 can be set to allow second crop seed from the second distribution tower 120 to flow through the valve 10, while blocking first crop seed from the first distribution tower 110 from reaching the opener. In this manner, first crop seed from the first distribution tower 110 can be supplied to every opener in the second set of openers 150B on the tool that is not connected to a valve 10, while the openers in the first set of openers 150A connected to valves 10 can be supplied with second crop seed. In this manner, first crop seed will be planted in adjacent pairs of rows, alternating with adjacent pairs of rows planted with second crop seed, resulting in alternating pairs of rows of different crop in a field.

To switch between mono-cropping and inter-cropping simply requires the operator to go and manually switch the gate valves 20A, 20B on the valves 10.

Figure 5:
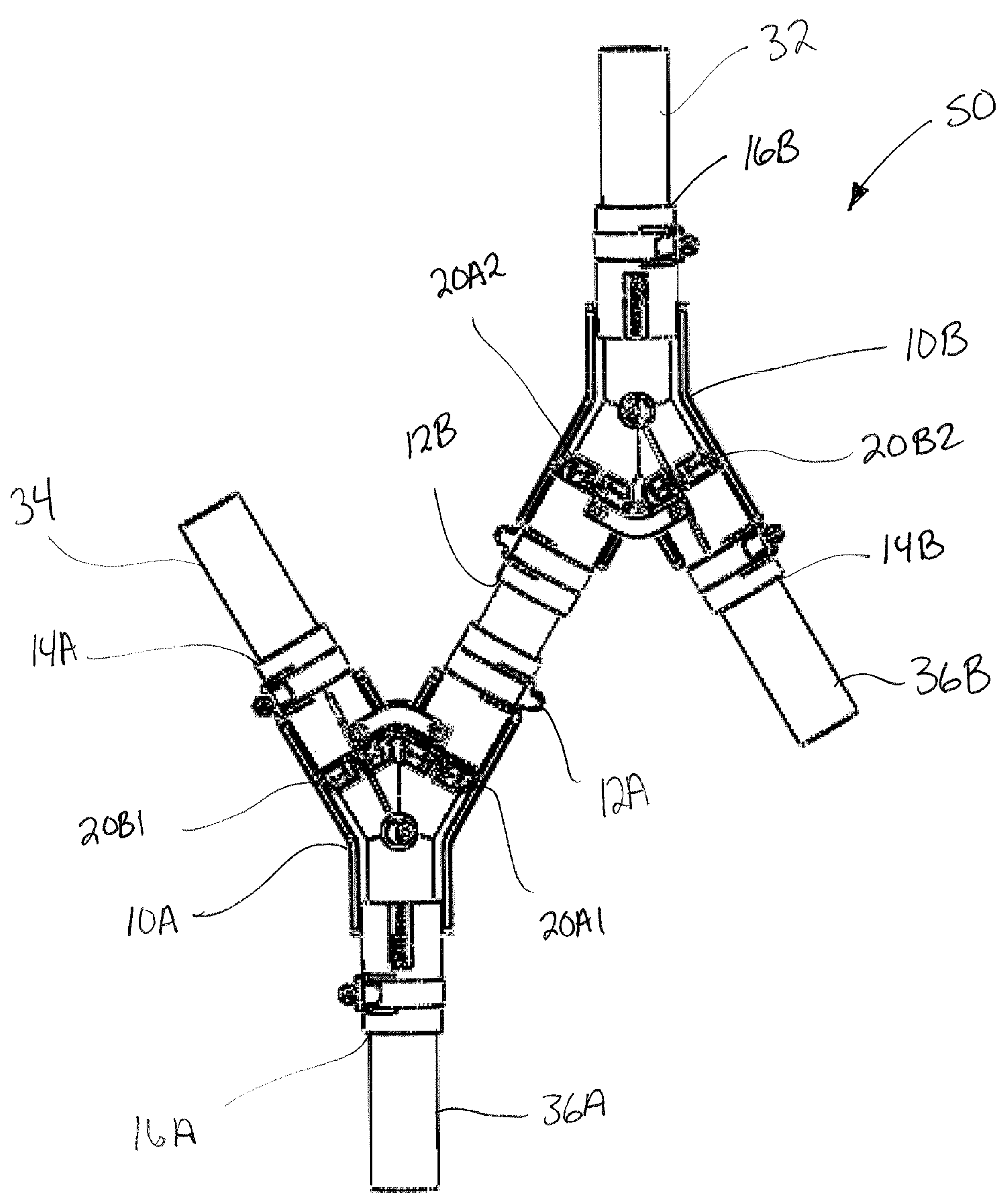
FIG. 5 is a front view of a multi-valve.

With system 100 and 200 shown in FIGS. 4A and 4B, there is no ability to dispense fertilizer. When seeding with mono-crop, the valves 10 stop the flow from the second distribution tower 120 and the second distribution tower 120 sits idle. Some minimal fertilizer could be mixed with the first crop seed in the air cart, if desired, or fertilizer could be broadcast, etc. However, this is not always desirable. FIG. 5 illustrates two valves 10A, 10B, such as valve 10 shown in FIG. 1, connected together to form a multi-valve 50 to be used with "double-shoot" air package that allows both seed and fertilizer to be introduced into the ground by a single opener (typically at different spots) or for mid-banding.

The first valve 10A can be connected to a second air hose 34, coming from a second tank on an air cart (not shown), at a second inlet 14A and to the second valve 10B at a first inlet 12A. An outlet 16A of the first valve 10A can be connected to an opener hose 36A running to a first shoot on an opener (not shown). The second valve 10B can be connected to a first air hose 32 from a first tank on the air cart by the outlet 16B (which in this case would operate as an input). A first inlet 12B of the second valve 10B can be connected to the first inlet 12A of the first valve 10A and the second inlet 14B of the second valve 10B can be connected to a opener hose 36B running to a second shoot on the opener.

Gate valves 20A1, 20B1 can be provided on the first valve to allow the valve 10A to be selectable between a first position, placing the first inlet 12A in fluid communication with the outlet 16A while fluid communication between the second inlet 14A and the outlet 16A is blocked, and, a second position placing the second inlet 14A in fluid communication with the outlet 16A while fluid communication between the first inlet 12A and the outlet 16A is blocked.

Gate valves 20A2, 20B2 can be provided on the first valve to allow the valve 10B to be selectable between a first position, placing the first inlet 12B in fluid communication with the outlet 16B while fluid communication between the second inlet 14B and the outlet 16B is blocked, and, a second position placing the second inlet 14B in fluid communication with the outlet 16B while fluid communication between the first inlet 12B and the outlet 16B is blocked.

Figure 6A:
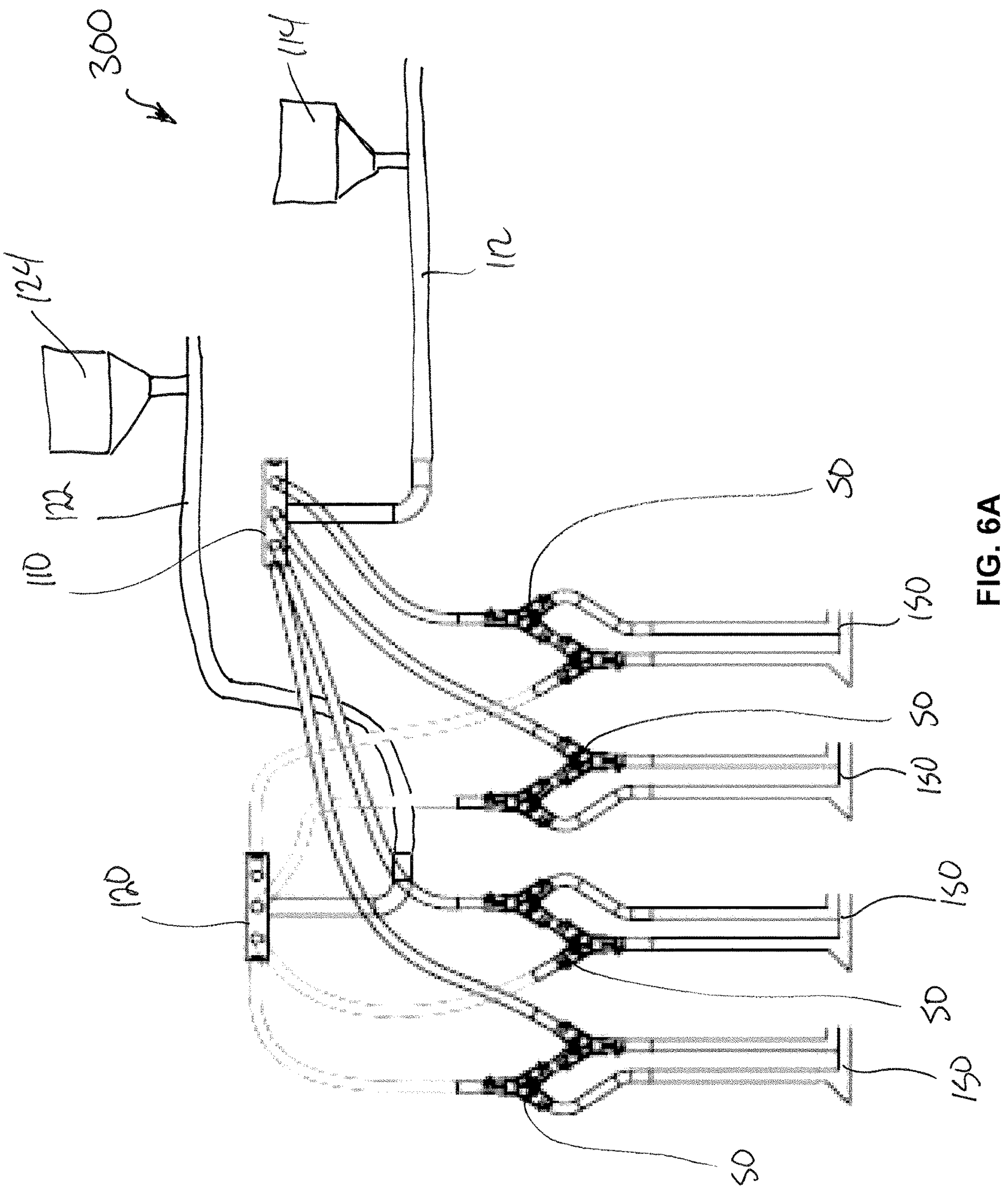
FIG. 6A is a schematic illustration of a system incorporating the multi-valve of FIG. 5 for selectively seeding alternate rows of different crops.

Referring to FIG. 6A, a system 300, in the upper configuration, is shown that can selectively allow inter-cropping of two different crops with alternating rows (with each opener double shooting both the first crop seed and the second crop seed) or mono-cropping with the double shoot on each opener also able to shoot fertilizer while also seeding the first crop with the first shoot on the opener.

The system 300 can plant alternating rows of first crop seed and second crop seed by adjusting the first valve 10A and the second valve 10B of each multi-valve 50 so that first crop seed from the first distribution tower 110 is directed to every other row and second crop seed from the second distribution tower 120 can be directed to the other rows. In this manner, the system 300 can be selectively configured to seed alternate rows of the first crop seed and the second crop seed in a field.

System 300 can also be selectively configured to mono-crop by adjusting the first valve 10A and the second valve 10B to plant a single crop from either the first distribution tower 110 or the second distribution tower 120. In this configuration, while the first crop seed is being distributed to all of the openers from the first distribution tower 110 through the multi-valve 50 (or the second distribution tower 120), fertilizer can be directed to the other shoot of each opener 150 from the second distribution tower 120 through the configured multi-valves 50. In this manner, the system 300 can mono-crop while also providing fertilizer in the same pass.

Figure 6B:
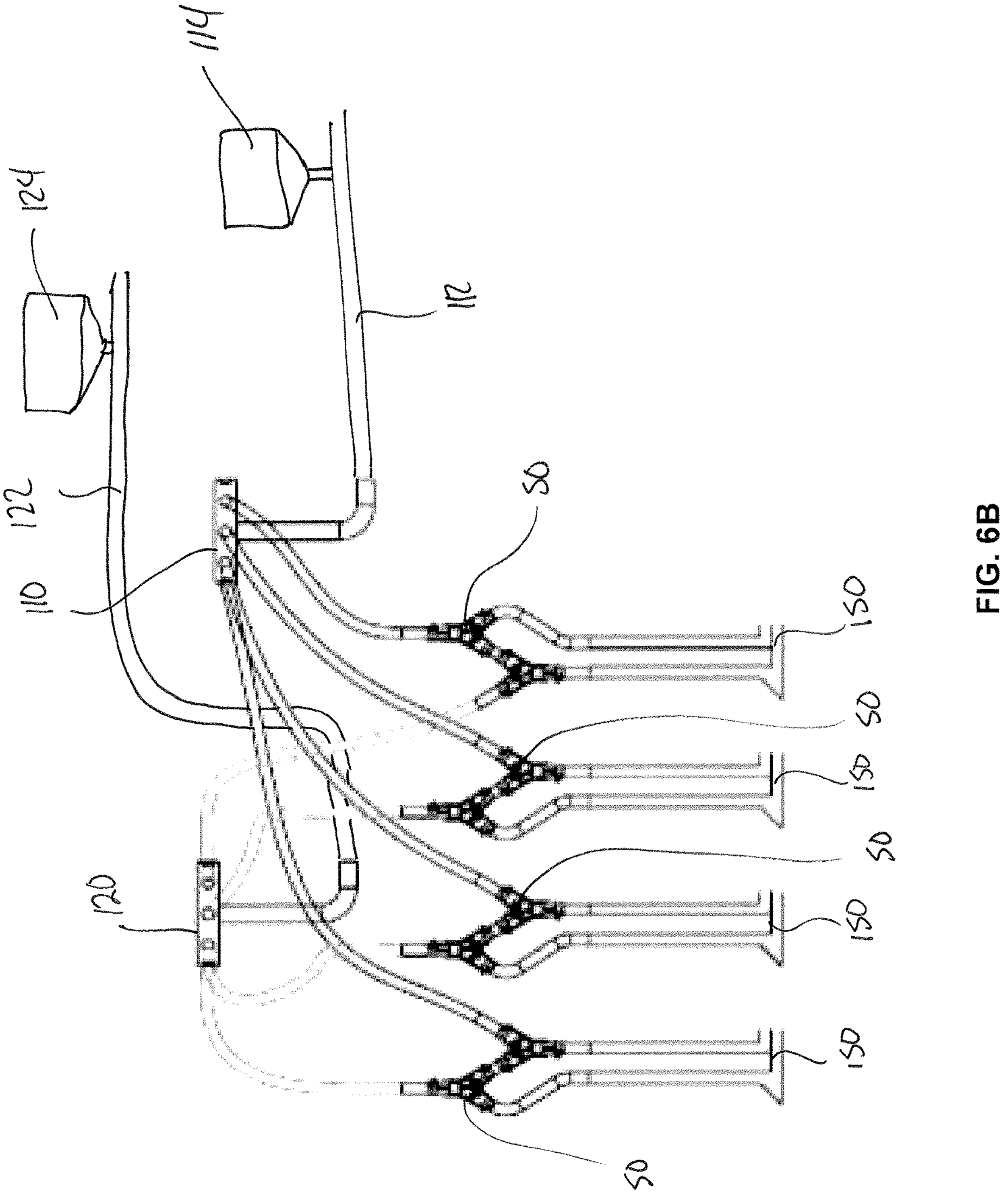
FIG. 6B is a schematic illustration of a system incorporating the multi-valve of FIG. 5 for selectively seeding alternate twin rows of different crops.

System 400, shown in FIG. 6B, allows the multi-valves 50 to be configured to inter-crop by seeding alternating adjacent pairs (twin rows) of the first crop and the second crop or mono-crop where only a single crop is seeded in a field, with the option to provide fertilizer in the same pass.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A system for allowing an air seeder to selectively multi-crop and mono-crop, the system comprising:

a first tank for holding a first particulate material;

a first distribution tower operatively connected to the first tank by at least one first transport hose and operative to receive the first particulate material from the first tank in a first air stream;

a second tank for holding a second particulate material;

a second distribution tower operatively connected to the second tank by at least one second transport hose and operative to receive the second particulate material from the second tank in a second air stream;

an opener hose leading to an opener; and at least one valve comprising:

a first inlet connected to the first distribution tower by a first hose;

a second inlet connectable to the second distribution tower by a second hose;

an outlet connectable to a opener hose running to an opener on the air seeder apparatus; and wherein the at least one valve is selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked.

2. The system of claim 1 wherein the valve further comprises: the first inlet connected to a first tube; the second inlet connected to a second tube; and the outlet connectable to an outlet tube, wherein the first tube and the second tube lead into the outlet tube.

3. The system of claim 2 wherein a first gate valve is provided passing through the first tube and a second gate valve is provided passing through the second tube.

4. The system of claim 2 wherein the first tube and the second tube have an inner diameter of 1.25 inches and wherein an end of the first hose inserted in the first tube of the valve is 3.5 inches from an end of the opener hose inserted in the outlet tube of the valve.

5. The system of claim 2 wherein the first hose and the second hose and an inner diameter of 1 inch and wherein an end of the first hose inserted in the first tube of the valve is 3.1 inches from an end of the opener hose inserted in the outlet of the valve.

6. The system of claim 1 wherein the first particulate material is a first crop seed and the second particulate material is a second crop seed.

7. The system of claim 1 wherein a valve corresponds to each opener in a first series of openers with each valve connected to an opener hose running to one of the openers in the first series of openers and an opener hose connected to the first distribution tower runs to each opener in a second set of openers.

8. The system of claim 7 wherein the first set of openers comprises every other opener, and wherein the second set of openers comprises openers adjacent to an opener in the first set of openers.

9. The system of claim 7 wherein the first set of openers comprises pairs of adjacent openers and wherein the second set of openers comprises pairs of adjacent openers provided between pairs of adjacent openers in the first set of openers.

10. A multi-valve for use with an air seeder to selectively supply particulate material to openers, the multi-valve comprising:

a first valve comprising:

a first inlet;

a second inlet connectable to a first air stream carrying a first particulate material;

an outlet connectable to a opener hose running to an opener on the air seeder apparatus; and at least one gate valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked; and a second valve comprising:

a first inlet connected to the first inlet of the first valve;

a second inlet connectable to an opener hose running to an opener on the air seeder apparatus;

an outlet connected to a second air stream carrying a second particulate material; and at least one gate valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked.

11. A system for allowing an air seeder to selectively apply seed and fertilizer, the system comprising:

a first tank for holding a first particulate material;

a first distribution tower operatively connected to the first tank by at least one first transport hose and operative to receive the first particulate material from the first tank in a first air stream;

a second tank for holding a second particulate material;

a second distribution tower operatively connected to the second tank by at least one second transport hose and operative to receive the second particulate material from the second tank in a second air stream;

opener hoses leading to openers; and a plurality of multi-valves connected to both the first distribution tower by a first hose and the second distribution tower by a second hose, each multi-valve comprising:

a first valve comprising:

a first inlet;

a second inlet connected to a first air stream carrying a first particulate material;

an outlet connectable to a opener hose running to an opener on the air seeder apparatus; and at least one gate valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked; and a second valve comprising:

a first inlet connected to the first inlet of the first valve;

a second inlet connectable to an opener hose running to an opener on the air seeder apparatus;

an outlet connected to a second air stream carrying a second particulate material; and at least one gate valve selectable between: a first position, placing the first inlet in fluid communication with the outlet while fluid communication between the second inlet and the outlet is blocked; and, a second position, placing the second inlet in fluid communication with the outlet while fluid communication between the first inlet and the outlet is blocked.

* * * * *